Oct. 17, 1933.  H. E. SJÖSTRAND  1,930,945
NAVIGATING APPARATUS AND METHOD OF OPERATING THE SAME
Filed Dec. 10, 1932  3 Sheets-Sheet 1
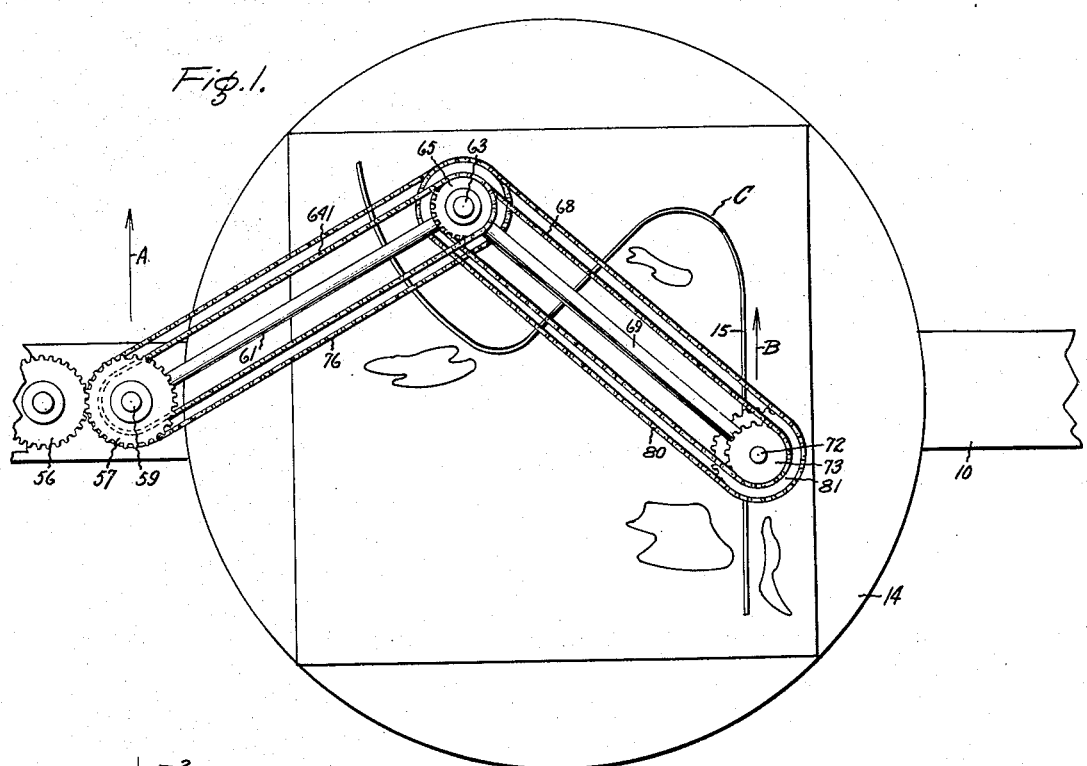
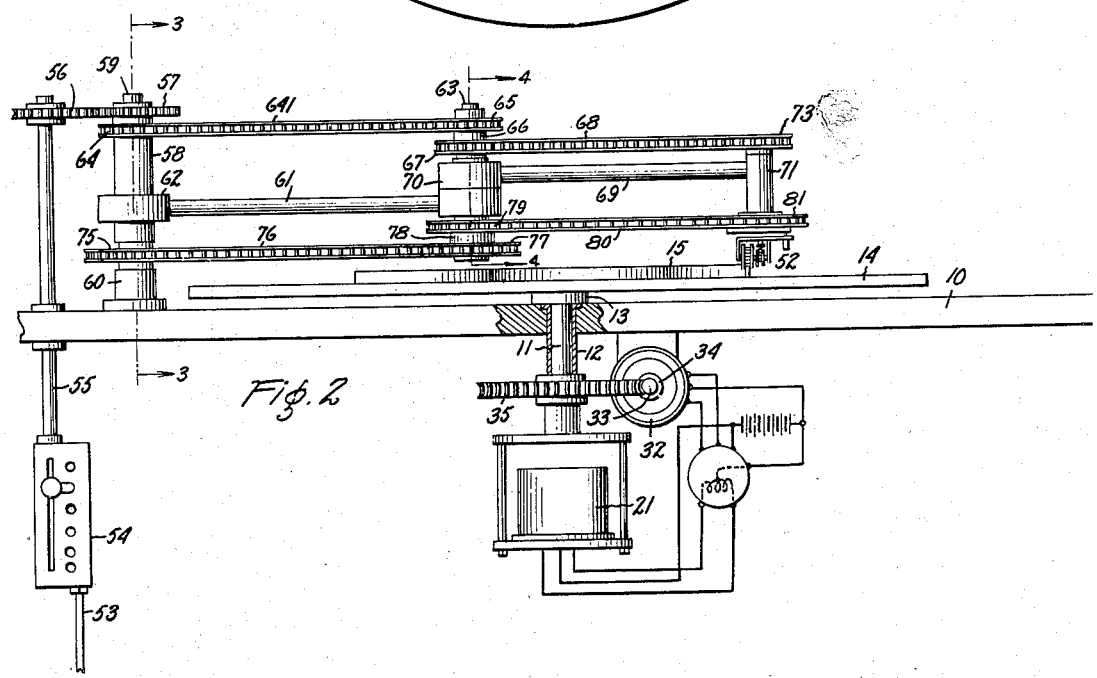
INVENTOR:
HJALMAR E. SJOSTRAND
by
His Attorneys Oct. 17, 1933.  H. E. SJÖSTRAND  1,930,945
NAVIGATING APPARATUS AND METHOD OF OPERATING THE SAME
Filed Dec. 10, 1932  3 Sheets-Sheet 3

INVENTOR:
HJALMAR E. SJOSTRAND,
by
HIS ATTORNEYS.

Patented Oct. 17, 1933

1,930,945

UNITED STATES PATENT OFFICE 1,930,945

NAVIGATING APPARATUS AND METHOD OF OPERATING THE SAME

Hjalmar E. Sjöstrand, Ravala, Grangesberg, Sweden

Application December 10, 1932
Serial No. 646,731

9 Claims. (Cl. 114—144)

One of the objects of my invention is the provision of a device which automatically steers a vessel or other movable body along a predetermined course. More specifically my invention preferably comprises a device including a platen or table which is oriented in a predetermined direction and on which is placed a track or other device along which a body is movable at a speed proportional to the speed of the vessel or other body, the various portions of which correspond both in magnitude and direction to that of the track, together with associated means for steering the vessel along a course conforming in shape to that of said track.

Another object of my invention is the provision of means for automatically recording on a chart or map the course pursued by a vessel or other movable body.

My invention will best be understood by reference to the accompanying drawings in which I have illustrated a preferred embodiment thereof and in which—

Fig. 1 is a plan view of one portion of the device embodying my invention;

Fig. 2 is a side view of Fig. 1;

Like reference characters indicate like parts throughout the drawings.

Figure 3:
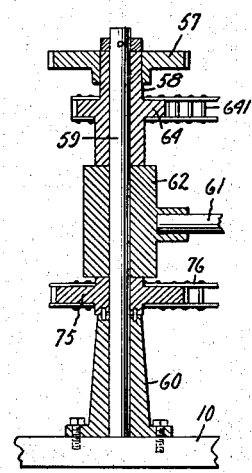
Fig. 3 is a section taken along the line 3—3 of Fig. 2.
Figure 4:
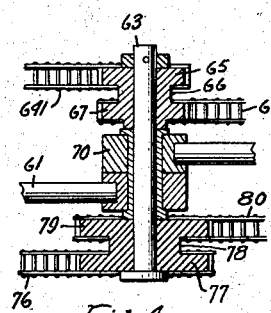
Fig. 4 is a section taken along the line 4—4 of Fig. 2.
Figure 5:
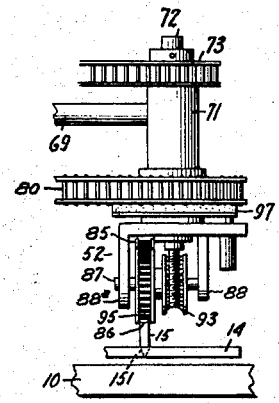
Fig. 5 is a side view of the carriage comprising a toothed wheel which engages a track rail.

Referring to the drawings, 10 is a support fixed to the vessel or other movable body and participating in the movement thereof. A shaft 11 is mounted in a bearing 12 in the support 10, the shaft being provided at its upper end with a head 13 to which is secured a table or platen 14 on which, in turn, is mounted a toothed track 15 which may be formed of more or less flexible material and which conforms in shape to the course to be pursued by a vessel or other movable body and all parts of which are proportional in magnitude to the corresponding portions of the course to be traversed by the vessel or other movable body.

Means are provided for maintaining the table or platen oriented in a substantially predetermined direction. In the embodiment of my invention illustrated, the means for thus maintaining the table oriented comprises a freely mounted magnetic needle 16 (Fig. 8) the spindle 17 of which has its bearings at 18 and 19 in the bottom and top plates, respectively, of a casing 20 which is mounted for universal movement within a dish shaped member 21, a gimbal ring 22 being interposed between the dish shaped member 21 and the casing 20. The magnetic needle is thus maintained in horizontal position irrespective of the movements of the vessel or other movable body on which it is mounted.

A source of light, which is illustrated as an incandescent lamp 23, is mounted in an open bottomed casing 24, the casing being mounted on a standard 25 which is in turn mounted on the casing 20.

Figure 10:
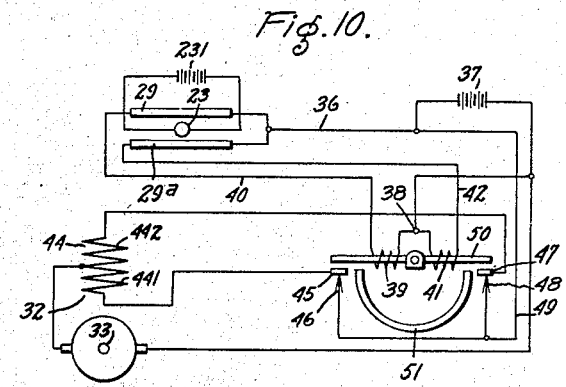
Fig. 10 is a diagram of connections of the device for maintaining the table in oriented position.

The lamp is included in a circuit including a battery 231 (see Fig. 10). A transverse opaque partition 26 is mounted in the casing 20 and is provided with a narrow slit through which passes a line of light which then passes through a projecting lens 27.

Figure 8:
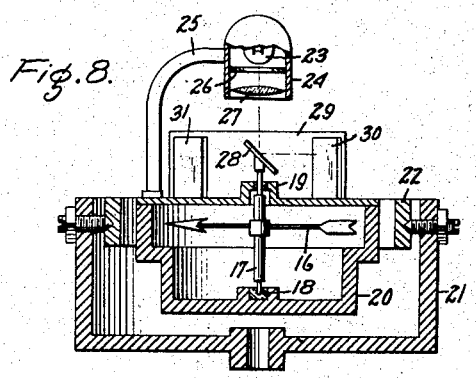
Fig. 8 is a sectional view illustrating certain of the parts which maintain the table or platen oriented in a predetermined direction.
Figure 9:
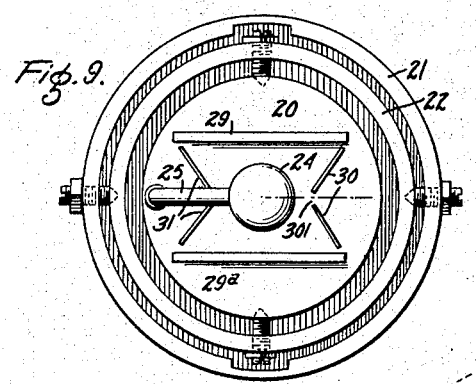
Fig. 9 is a plan view of Fig. 8.

A mirror 28 is mounted on the upper end of the spindle 17 and preferably at an angle of 45° thereto. Selenium or other photo-electric cells 29 and 29a are mounted on the casing 20 in spaced, and preferably in parallel relation, as best shown in Figs. 8 and 9. At the respective ends of the cells are mounted two pairs of mirrors 30 and 31 respectively arranged at an angle to the photo-electric cells. The ends of the two pairs of mirrors 30 and 31 are slightly spaced to form an opening, 301 and the lens 27 is so located relatively to the slit in the partition 26 as normally to project the image of the slit between the mirrors 30.

I have illustrated a device for mounting the mirrors and the parts associated therewith which are applicable to a vessel or other movable body where the angle of turning of the vessel from the horizontal is through a comparatively small angle. It will, of course, be understood that if the device were used on an airplane, as it is at times intended to be, and where the plane may turn through an angle of 360°, that the gimbal ring 22 would have to be sufficiently large and the dished member 21 would have to be of sufficient depth to permit them to turn around the casing 20. The means for maintaining the table oriented in a predetermined direction also comprises a motor 32 which, it will be understood, is mounted on a stationary portion of the vessel. The shaft 33 of the motor is provided with a worm 34 which engages a worm wheel 35 fast on the shaft 11.

Referring particularly to Fig. 10, the selenium cells 29 and 29a are connected by a conductor 36 to one pole of a battery 37 the other pole of which is connected to a point 38 from which the circuit branches, one branch of the circuit passing through a coil 39 and conductor 40 to the selenium cell 29 while the other branch includes a coil 41 and a conductor 42 which is connected to the other selenium cell 29a.

The battery 37 is also connected to the armature 43 of the motor 32. The motor comprises a field indicated generally at 44 and comprising two windings 441 and 442. The terminal of the coil 441 is connected to a movable contact member 45 which cooperates with a fixed contact 46, while the terminal of the field coil 442 is connected to a movable contact 47 which cooperates with a fixed contact 48. Both of the fixed contacts 46 and 48 are connected by a conductor 49 to the battery 37. I have illustrated the coils 39 and 41 as wound around a bar of iron 50 in a direction to produce opposite poles at the associated end of the bar when either of the said coils is energized. A permanent magnet 51 is located adjacent to the bar 50 so that the associated end of the bar 50 is depressed when the coil 39 or 41 is energized, and the contact 45 or the contact 47 brought into engagement with the contact 46 or 48, respectively, the two coils being wound upon the bar in such directions as to reverse the poles at the ends of the bar when the respective coils are energized.

The operation of the device for correcting the position of the table or platen 14 and for maintaining the same oriented in a predetermined direction is as follows.

Normally, as above described, the beam of light from the light source 23 passes through the space or opening 301 between the mirrors 30. Assuming that the vessel on which the device embodying my invention is mounted turns from a straight line course, then the support 10 participates in this movement and will be turned. The casing 20 will also be turned while the magnetic needle 16 and the mirror 28 which is mounted on the spindle thereof will remain stationary. The beam of light from the lamp 23 will then, instead of passing through the opening 301 between the mirrors, be directed against one or the other of the mirrors 30 depending upon the direction of turning of the vessel and the light will be reflected against the photo-electric cell 29 or 29a. Assuming that the vessel turns in such a direction as to direct the beam of light against the selenium cell 29, the resistance of the cell is then greatly decreased and the coil 39, which is included in the circuit of the cell 29 and which is normally deenergized is now energized and the associated end of the bar 50 is attracted by the permanent magnet 51, and the left-hand end of the bar as viewed in Fig. 10 brings the movable contact 45 into engagement with the stationary contact 46 thereby closing the circuit from the battery 37 through the armature of the motor, the field coil 441 and the contacts 45 and 46 to the other pole of the battery. The armature of the motor is thereby caused to rotate in a direction to turn the worm wheel 35 and the table 14 and the dished member 21 which are movable therewith back to the position where the light beam from the mirror 28 passes through the opening 301.

Conversely should the vessel turn in the opposite direction, then the light from the lamp 23 would be directed against the photo-electric cell 29a, the contacts 47 and 48 would be closed and the circuit closed through the armature of the motor 32 and through the field 42, and as the current is reversed in the field, the armature of the motor would then rotate in the opposite direction, thereby returning the photo-electric cells and the table to their normal positions.

While I have illustrated photo-electric cells and associated means for maintaining the table oriented in a predetermined direction, it will be understood that any known means such, for example, as a gyro-compass, may be utilized for this purpose.

Figure 6:
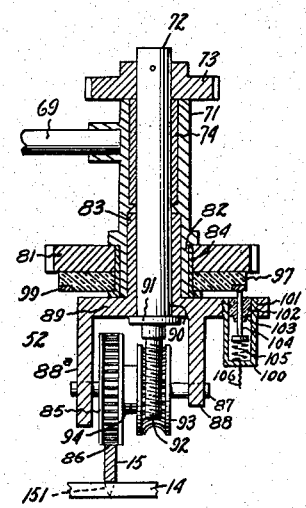
Fig. 6 is a vertical section taken through Fig. 5.
Figure 7:
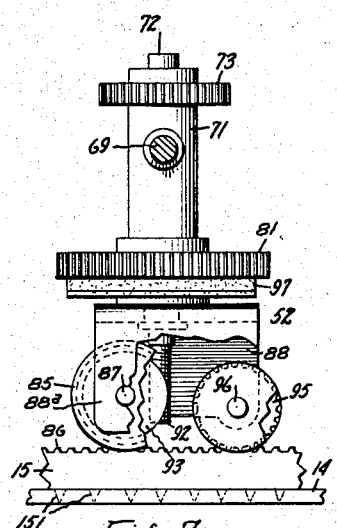
Fig. 7 is a sectional side view, partially broken away, of Fig. 5.

In accordance with my invention, a carriage indicated generally at 52 as best shown in Figs 6 and 7 is moved along the track 15 at a speed proportional to the speed of the vessel, and is preferably actuated directly by a device which is driven in accordance with the speed of the vessel or other movable member. In the embodiment of my invention illustrated a shaft 53 (see Fig. 2) is driven by the log of a vessel or by other speed meter controlled drive, and, through a stepped gearing 54, actuates a shaft 55 mounted in the support 10 and on the upper end of which is mounted a gear 56. The gearing 54 may be adjusted in accordance with the requirements of different-sized charts which may be used. The gear 56 meshes with the gear 57 secured on a hub 58 readily rotatable on a shaft 59 which is secured in the support 10 and a hub 60 fast thereon. A supporting arm 61 is mounted on a hub 62 surrounding the shaft 59 and supports a shaft 63. A sprocket 64 is mounted on the hub 58 and is engaged by a sprocket chain 641 which engages a sprocket wheel 65 loosely mounted on the shaft 63. The sprocket 65 is secured to a hub 66 readily rotatable on the shaft 63 and to which is secured a sprocket 67 engaged by a sprocket chain 68. A supporting arm 69 is secured to a hub 70 surrounding the shaft 63 and carries at its free end a hub 71 surrounding a shaft 72. To the shaft 72 is fixed a sprocket 73 which is engaged by the sprocket chain 68.

A bearing sleeve 74 is preferably interposed between the hub 71 and the shaft 72. The shaft 72 is thus continuously operated by the log of the vessel or other speed meter control drive.

A sprocket wheel 75 is secured to the hub 60 which is in turn secured to the support 10 so that the sprocket wheel 75 turns with the support and the vessel or other movable body to which the support is fixed. The sprocket wheel 75 is engaged by a sprocket chain 76 which also engages a sprocket wheel 77 fixed to a hub 78 surrounding the shaft 63. On the hub 78 is also mounted a sprocket wheel 79 which is engaged by a chain 80 which also engages a sprocket wheel 81 surrounding the shaft 72. A bearing sleeve 83 is preferably interposed between the shaft 72 and the portion 82 of the hub 71. A second sleeve 84, preferably surrounds the portion 82 of the hub and forms an insulating surface for the sprocket wheel 81 to bear upon.

The carriage 52 comprises a toothed wheel 85 which engages the teeth 86 on the track or rail 15. The wheel 85 is mounted on a shaft 87 having its bearings in brackets 88 and 88a which are preferably integral with a head 89 provided with an opening 90 through which passes the shaft 72, the lower end of the shaft preferably being provided with a flange 91 on which the head 89 is supported, it being understood that the head 89 easily turns on the shaft 72. The lower end of the shaft 72 is provided, in the embodiment illustrated, with a worm 92 which engages a worm wheel 93 secured to a hub 94 on the shaft 87 to which hub the toothed wheel 85 is also secured. The sleeve 83 is preferably integral with the head 89, as best shown in Fig. 6. The carriage 52 is also preferably equipped with a second toothed wheel 95 mounted on a shaft 96 havings its bearings in the brackets 88 and 88a. The track rail 15 may be secured to the platen as by providing the lower face thereof with teeth 151 which are inserted in the platen or table 14.

A disc 97 (see Fig. 6) formed of insulating material is secured to the sprocket wheel 81 and is provided on its lower side, preferably along the edge thereof, with conducting segments 98 and 98a (see Fig. 11) which are separated by insulated members 99. Mounted on the head 89 is a cylindrical casing 100 of insulating material closed at its lower end, as illustrated in Fig. 6, and provided at its upper end with screw threads which are received in a screw-threaded opening 101 in the head 89. The upper end of the casing 100 is closed as indicated at 102 and is provided with a central opening 103 through which passes a stem 104 formed of conducting material which is forced upwardly by a spring 105 into engagement with either of the conducting segments 98 or 98a or one of the insulating members 99. A conductor 106 is electrically connected to the spring and to the stem 104, it being understood that the width of the stem 104 is less than that of the insulating members 99. The conductor 106 includes a battery 108 (Fig. 11), the conductor being connected to the armature 109 of a motor indicated generally at 110, the field of which is indicated generally at 111 and comprises two windings 111a and 111b. The opposite terminal of the armature of the motor is connected by a conductor to an intermediate point 113 of the field winding. The other terminal of the field winding 111a is connected by a conductor 114 to the conducting segment 98 while the other terminal of the winding 111b is connected by a conductor 115 to the conducting segment 98a.

The armature of the motor actuates the rudder or other steering member of the movable body. In the embodiment illustrated the armature 109 actuates a shaft 109a on which is mounted a bevel gear 109b engaging a bevel pinion 109c mounted on a shaft 109d having its bearing in a bracket 109e which is fixed to the vessel. On the end of the shaft 109d is mounted a pinion 109f which engages a toothed segment 109g secured to a shaft 109h to which is also secured a bar 109k. The bar 109k is connected to a parallel bar 109l by two links 109m. A rudder 109n is secured to the bar 109l. When the rudder is turned from its normal intermediate position and the vessel is moving, the force against the rudder exerted by the water tends to return the same to its normal intermediate position. This action of the rudder is preferably assisted by compression springs 109o connected to the bar 109k and to a stationary part and which tend to return the bar 109k and the rudder 109n which is connected thereto to the intermediate position.

The operation of the device embodying my invention is as follows:

The track 15, as above stated, is made of the same form as the course which is to be pursued by the vessel and the parts thereof occupy the same relative position on the chart, which may be mounted on the table, as the course which is to be pursued by the vessel occupies relative to the earth's surface. The log or other speed meter controlled drive actuates the shaft 53 which in turn actuates the shaft 55, the gear 56 and through the described connections rotates the shaft 72 and the toothed wheel 85 which is thereby driven along the track rail at a speed proportional to the speed of the vessel or other movable body.

Figure 12:
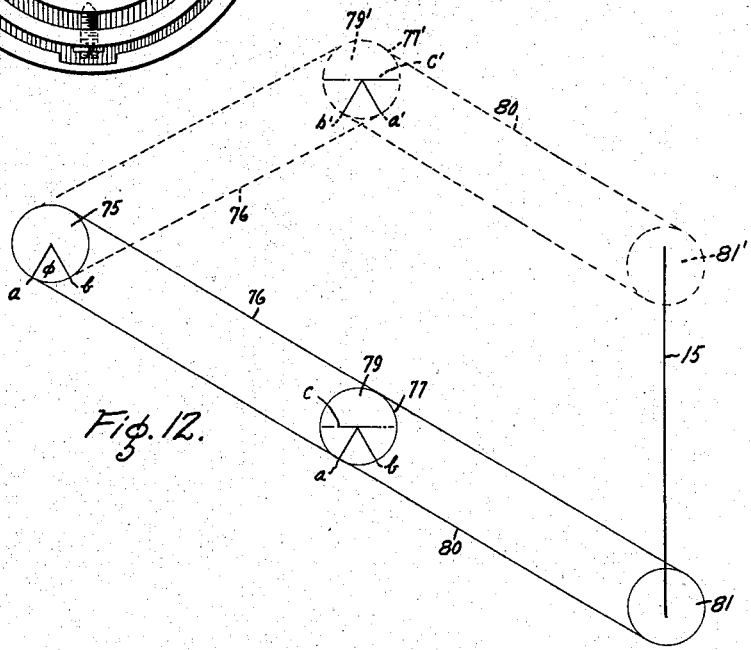
Fig. 12 is a diagrammatic view illustrating the mode of operation of certain parts.

The arrow A, in Fig. 1, may indicate the longitudinal axis of a vessel while the arrow B, which is parallel to the arrow A, represents the direction of travel of the carriage, and the device embodying my invention maintains the axis of the vessel or other movable body substantially parallel to the direction of movement of the carriage. When the carriage moves along a straight portion of the track, as it is illustrated as moving in Fig. 1, the carriage, of course, moves along a straight line, and a given diameter through the sprocket wheel 81 moves parallel to itself. This fact will best be understood by reference to Fig. 12 in which the four sprocket wheels 75, 77, 79 and 81 and the chains engaging the same are illustrated as in a straight line, it being assumed that the carriage has been moved downwardly in Fig. 1 to a position where the sprockets referred to and the chains engaging the same are in a straight line.

Now, assume that the carriage moves along a straight portion of the track rail 15 carrying the sprocket wheel from the full line position 81 to the dotted line position 81' and the sprockets 77 and 79 move to the position indicated by dotted lines 77' and 79', it being remembered that the sprocket 75 is fixed. In moving from the full line position to the dotted line position, the sprocket chain 76 moves around the stationary sprocket wheel 75. In other words, a portion of the lower run of the sprocket chain 76, as viewed in Fig. 2, is wrapped around the sprocket wheel 75 from the tangent of the chain originally at "a" to the position "b" and through an angle represented by $\phi$. It will be obvious that the same amount of chain is wrapped around the sprocket 77 from the point b' on the sprocket 77 to the point a. In other words in moving from the full line position indicated in Fig. 12 to the dotted line position, the sprocket wheel 77 is not rotated and a diameter taken through the sprocket wheel, such as indicated at c, moves parallel to itself as the sprocket is moved from the full line position to the dotted line position. As the sprocket wheel 79 is fixed to the sprocket wheel 77, the sprocket wheel 79 likewise does not rotate in space. By the same token, the sprocket wheel 81 is not rotated in space as it moves from the full line position to the dotted line position indicated in Fig. 12.

Figure 11:
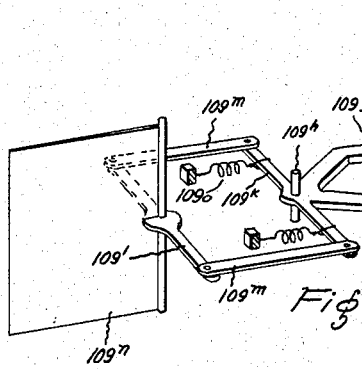
Fig. 11 is a diagram of connections illustrating the means for automatically steering the vessel or other movable body.

The parts are so arranged that when the carriage is moving along a straight portion of the track, then the contact 104 engages one of the ininsulating members 99, as indicated in Fig. 11. The circuit to the armature of the motor is open and the rudder of the vessel is not moved and the ship pursues a straight course parallel to the direction of movement of the carriage. When the carriage encounters a curved portion of the track, as indicated at C, then the direction of movement of the carriage is changed with the result that the contact 104 which is mounted on the frame of the carriage is moved into engagement with one or the other of the conducting segments 98 or 98a depending upon the direction of the angular movement of the carriage. In the embodiment illustrated, the contact would be moved into engagement with the conducting segment 98, and the circuit is closed from the battery 108 through the armature 109 of the motor, through the winding 111a of the field of the motor, contact 114, segment 98, contact 106 to the other pole of the battery. The motor is thereby rotated in a direction to turn the rudder by the described connections in such a direction as to change the direction of movement of the vessel and bring the axis thereof into parallel relation with the changed direction of movement of the carriage. As the carriage continues to pass around the curved portion of the track, the rudder will be held to a position which will cause the vessel to assume a direction of movement parallel to the direction of movement of the carriage.

As the vessel or other movable body turns in response to the turning of the rudder, the sprocket wheel 75 is rotated somewhat relatively to the table or platen 14. Under the conditions assumed, the sprocket wheel 75, sprocket chains 76 and 80 and sprocket wheel 81 and the disc 97 secured thereto are all rotated counter-clockwise to bring the insulating member 99 back beneath the contact 104.

In case the vessel deviates from its true course, the sprocket 75 turns with the vessel relatively to the oriented table and the carriage which is movable thereon. If for example the vessel turns clockwise as viewed in Fig. 1, the sprocket wheel 75 is likewise turned clockwise as well as the sprocket chain 76, sprocket wheels 77 and 79, sprocket chain 80 and sprocket wheel 81 which rotates the disc 97 clockwise and brings the segment 98 over the contact 104 to close a circuit which brings about the return of the vessel to its true course in a manner which will be clear from the foregoing description.

Since the speed of movement of the carriage is proportional to the speed of the vessel or other movable body and the direction of movement of the vessel is maintained parallel or substantially parallel to the direction of movement of the carriage, it is obvious that the course pursued by the vessel will conform in shape and in magnitude to the component parts thereof of the track over which the carriage moves.

Figure 13:
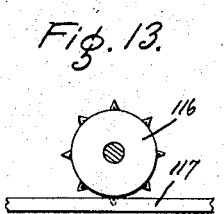
Fig. 13 illustrates a device for recording on a chart the course pursued by a vessel.

In Fig. 13 I have illustrated a device that is adapted to cooperate with the apparatus heretofore described for recording the course of the vessel or other movable body upon a chart. The toothed wheel 85 is replaced by a wheel 116 provided with pointed teeth which are spaced sufficiently so that one tooth only engages a chart 117 at a given time. The toothed wheel 95 is also omitted. The frame 89 of the carriage is locked to the sprocket chain 81 and the motion of the shaft 72 is intermittent so that the toothed wheel 116 quickly moves from one tooth to the next so that no tearing of the chart occurs because of the turning movement of the carriage.

It will be obvious that the wheel 116 will thus be caused to mark out a course on the chart which corresponds to the course pursued by the vessel or other movable body and thereby indicate on the chart the course pursued by that body.

While I have described my invention in its preferred embodiment, it is to be understood that the words which I have used are words of description rather than of limitation and that changes within the purview of the appended claims may be made without departing from the true scope and spirit of my invention in its broader aspects.

What I claim is:

1. In a navigating apparatus for a vessel, means movable substantially in proportion to the speed of the vessel, a member movable by said means, and means operable in response to the movement of said member for automatically steering said vessel.

2. In a navigating apparatus for a vessel, means movable substantially in proportion to the speed of the vessel, a member movable by said means, and mechanical means operable in response to the movement of said member for automatically steering said vessel.

3. In a navigating apparatus for a vessel, a support, means for orienting said support in a substantially predetermined direction, a track mounted on said support and conforming in shape to the course to be pursued by said vessel and the component parts of which bear a predetermined fixed relation to the component parts of said course, an element movable at a speed substantially proportional to the speed of said vessel, a device movable along said track at a speed proportional to the speed of said element, and means controlled by the movement of said device for automatically steering said vessel along a course substantially conforming in shape to that of said track.

4. In a navigating apparatus, a support, means for permanently orienting said support in a substantially predetermined direction, a track mounted on said support and conforming in shape to the course to be pursued by said vessel and the component parts of which bear a predetermined fixed relation to the component parts of said course, an element movable at a speed substantially proportional to the speed of said vessel, a device movable along said track at a speed proportional to the speed of said element, and means controlled by the movement of said device for automatically steering said vessel along a course conforming in shape to that of said track.

5. In a navigating apparatus, a support, means for maintaining said support permanently oriented in a predetermined fixed direction, a track mounted on said support and conforming in shape to the course to be pursued by said vessel, and the component parts of which bear a predetermined fixed relation to the component parts of said course, an element movable at a speed substantially proportional to the speed of said vessel, a device movable along said track at a speed substantially proportional to the speed of said means, and means operable in response to changes in direction of said device produced by changes in direction of said track for changing the direction pursued by said vessel to conform in shape to that of said track.

6. In a navigating apparatus, a support, means for maintaining said support oriented in a substantially predetermined direction, a track mounted on said support and conforming in shape to the course to be pursued by said vessel and the component parts of which bear a predetermined fixed relation to the component parts of said course, a movable member, means for actuating said member at a speed substantially proportional to the speed of said vessel, a carriage mounted on said track, means for moving said carriage along said track at a speed substantially proportional to the speed of said movable member, and means responsive to changes in direction of the vessel from the course which conforms to that of the track for automatically changing the course of said vessel to conform to that of said track.

7. In a navigating apparatus, a support, means for maintaining said support oriented in a substantially predetermined direction, a track mounted on said support, and conforming in shape to the course to be pursued by said vessel and the length of which bears a predetermined fixed relation to the length of said course, means movable at a speed substantially proportional to the speed of said vessel, a carriage movable along said track, means for moving said carriage along said track at a speed proportional to the speed of said carriage, and means for maintaining the direction of said vessel substantially parallel to the portion of the track which is being traversed by said carriage.

8. In a navigating apparatus, a support, a toothed track mounted on said support and conforming in shape to the course to be pursued by said vessel and the length of which bears a predetermined fixed relation to the length of said course, means movable at a speed substantially proportional to the speed of said vessel, a carriage mounted on said track and comprising a toothed wheel meshing with the teeth of said track, means for rotating said toothed wheel at a speed proportional to the speed of said means, and means for automatically steering said vessel along a course conforming in shape to that of said toothed track.

9. In a navigating apparatus for a vessel, a support, means for orienting said support in a substantially predetermined direction, a track mounted on said support and conforming in shape to the course to be pursued by said vessel and the component parts of which bear a predetermined fixed relation to the component parts of said course, an element movable at a speed substantially proportional to the speed of said vessel, a device movable along said track at a speed proportional to the speed of said element, and means controlled by the movement of said device for turning the rudder in a direction to bring the axis of the vessel parallel to the direction of movement of said device.

HJALMAR E. SJÖSTRAND.